Nov. 24, 1959     W. B. EDDISON     2,914,059
SMOKE GENERATOR
Filed July 13, 1954     5 Sheets-Sheet 4
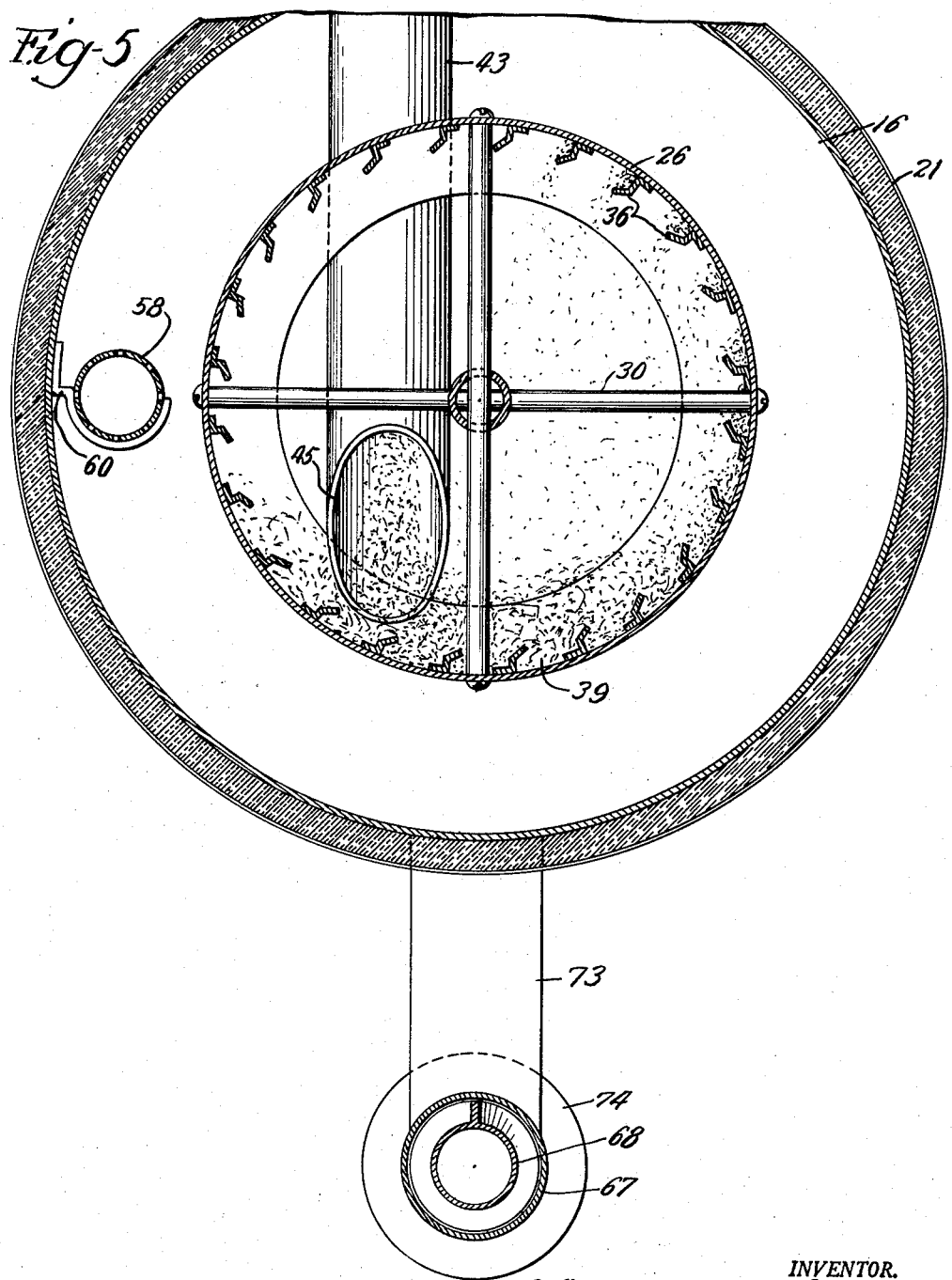
INVENTOR.
William Barton Eddison
BY
Cromwell, Greist & Warden
Attys.

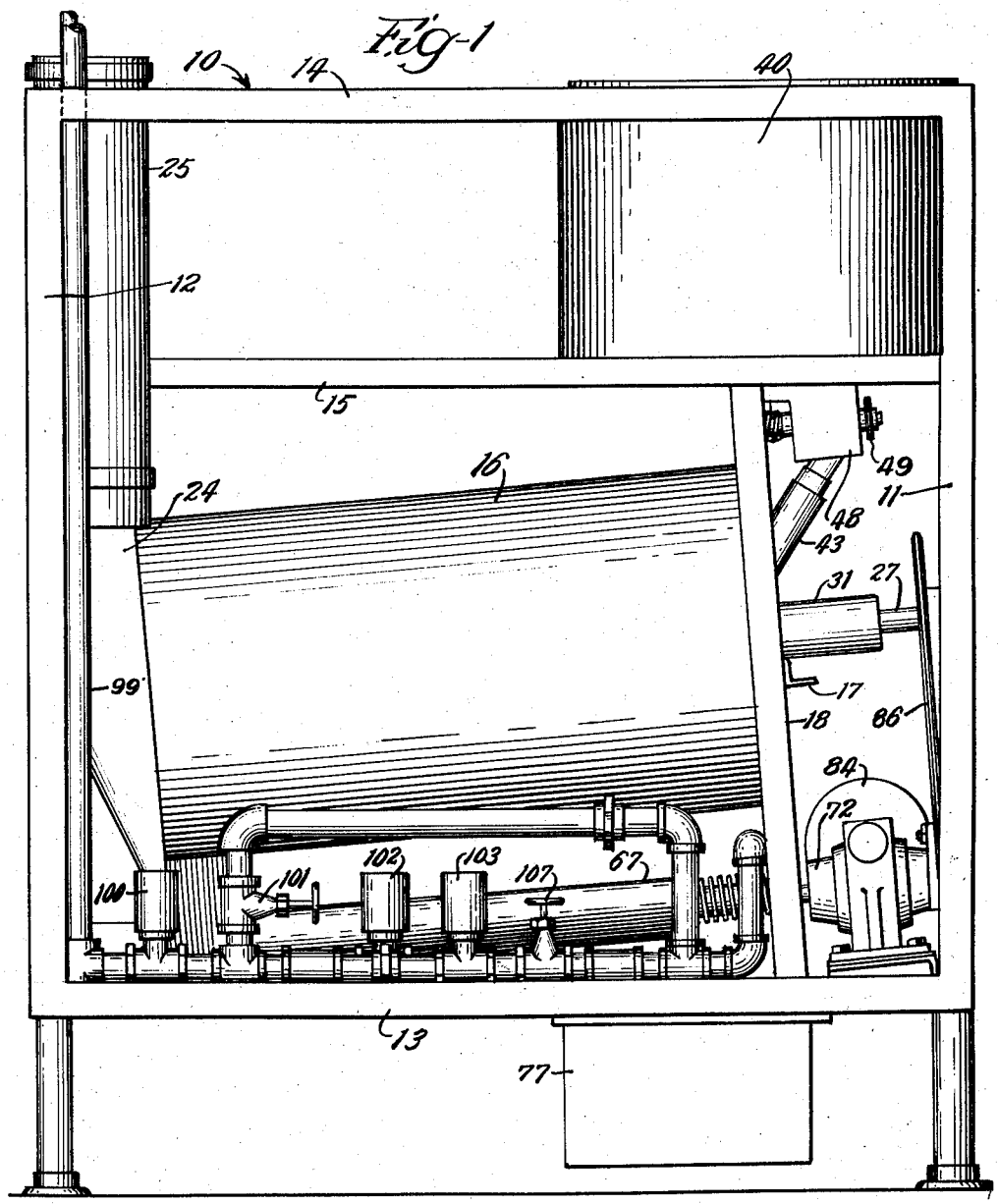

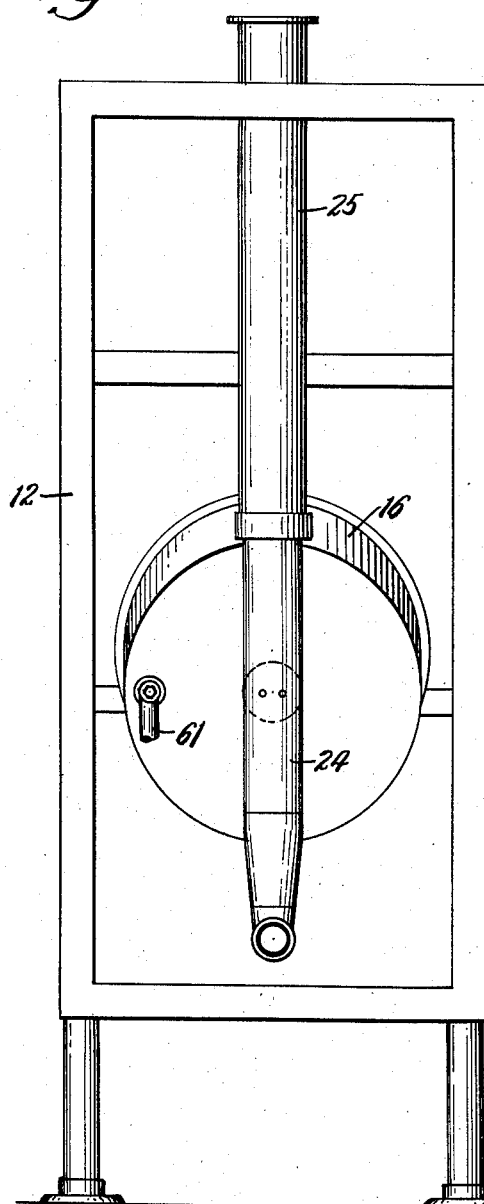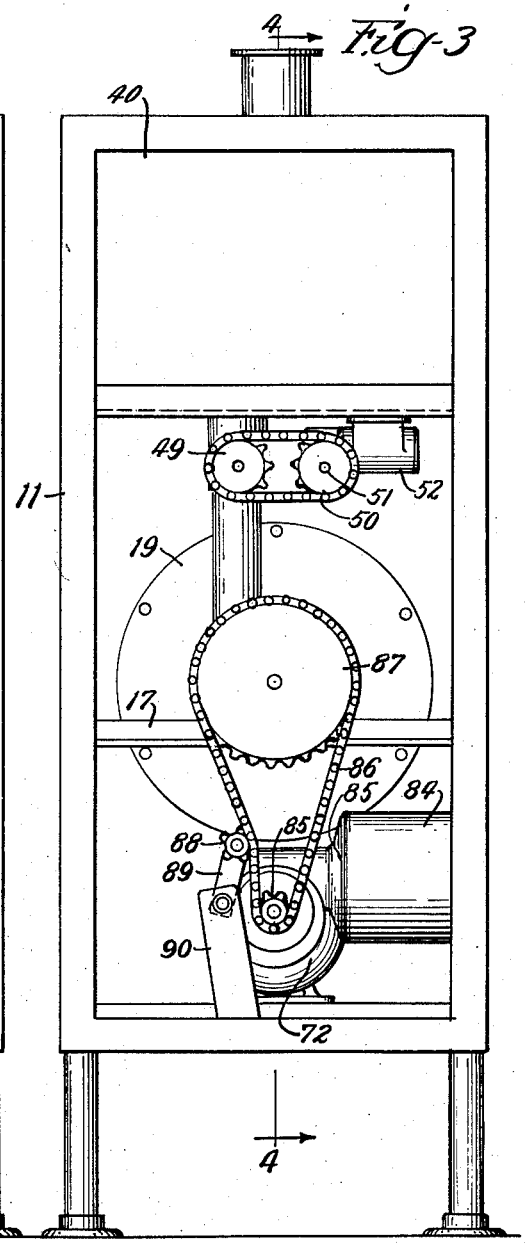

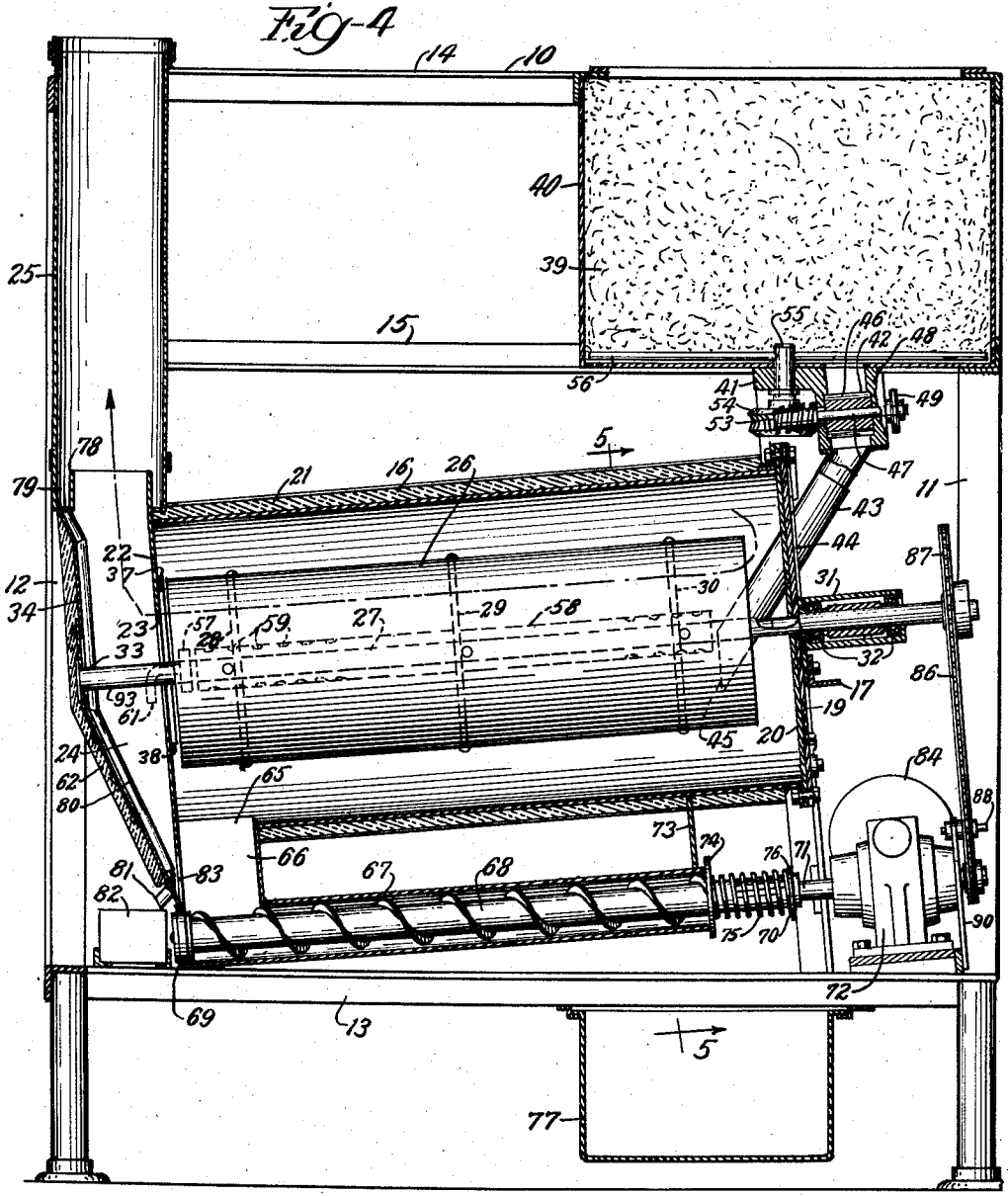

Nov. 24, 1959 W. B. EDDISON 2,914,059
SMOKE GENERATOR
Filed July 13, 1954 5 Sheets-Sheet 5
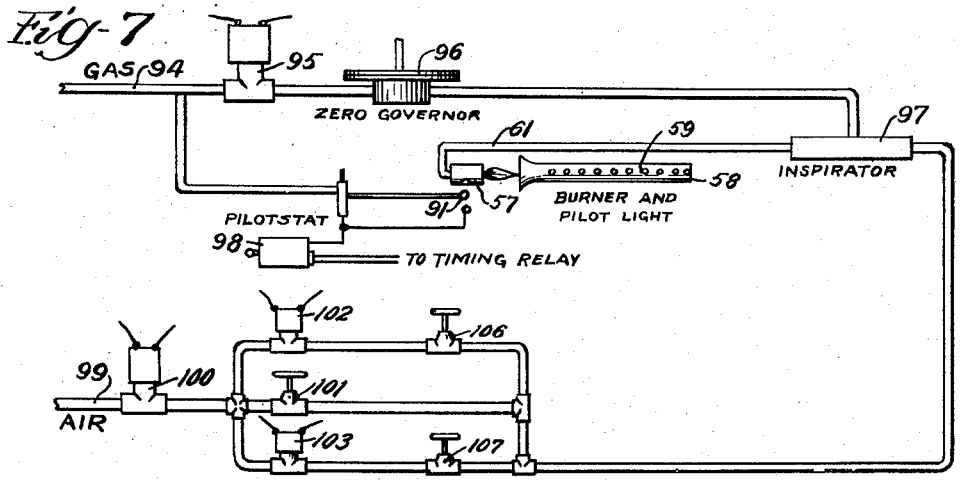
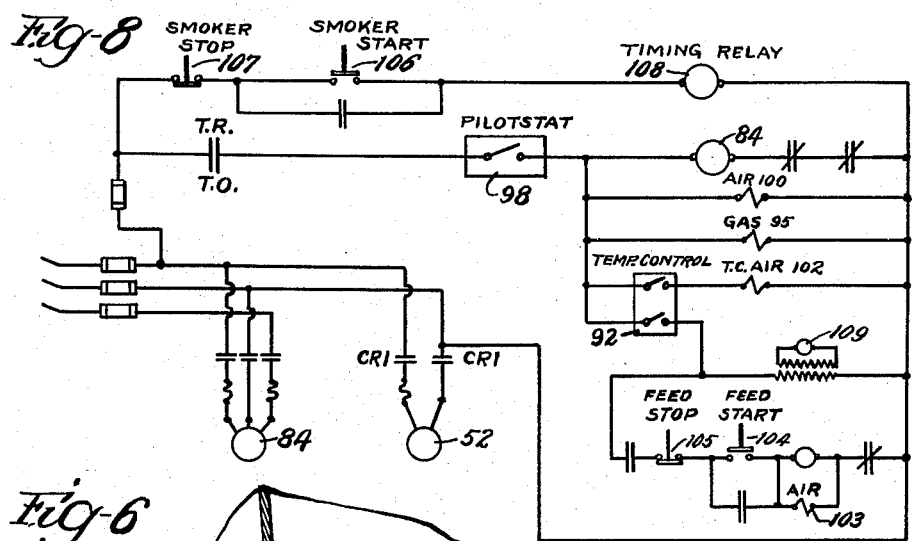
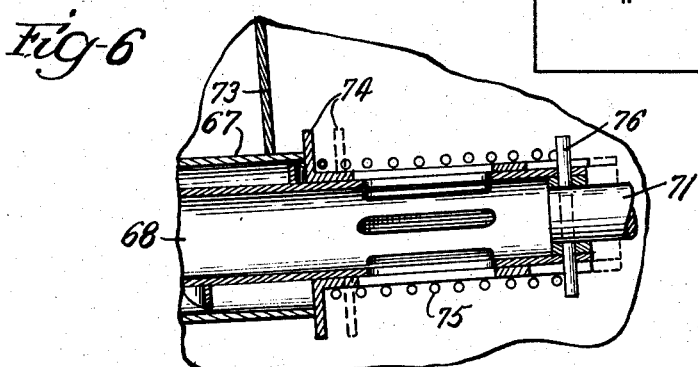
INVENTOR.
William Barton Eddison
BY
Cromwell, Greist & Warden
Attys.

United States Patent Office 2,914,059
Patented Nov. 24, 1959

2,914,059

SMOKE GENERATOR

William Barton Eddison, Irvington, N.Y., assignor to Oscar Mayer & Co., Inc., Chicago, Ill., a corporation of Illinois Application July 13, 1954, Serial No. 443,009

2 Claims. (Cl. 126—59.5)

This invention relates to apparatus for use in connection with the curing of meats or other foods or substances and is more particularly concerned with improvements in a device for subjecting wood to destructive distillation and releasing therefrom the gaseous constituents or smoke required for the curing operation.

It is a general object of the invention to provide an improved apparatus for producing smoke from wood sawdust wherein the sawdust is treated or distilled under controlled conditions which results in a more efficient and economical production of the smoke.

It is a more specific object of the invention to provide a mechanism for producing smoke by the destructive distillation of finely divided wood or sawdust wherein the distillation is carried out within a closed system under uniform temperature and other conditions which may be controlled by the operator.

It is a still more specific object of the invention to provide a smoke generator wherein finely divided wood or sawdust is subjected to destructive distillation within a chamber or compartment in which a hot gas is circulated, the gas being at a sufficiently high temperature to distill the sawdust as it is advanced through the chamber and the conditions within the chamber being controlled to eliminate fire due to free oxygen and to avoid precipitation of creosote.

It is a further object of the invention to subject sawdust to destructive distillation within a combustion chamber in which a mixture of gas and air is ignited and the products of combustion are circulated to distill the sawdust, the neutral products of combustion being used as a carrier for the smoke and the supply of air being controlled whereby fire due to the presence of free oxygen in the chamber is eliminated.

It is another object of the invention to provide a smoke generator wherein an open-ended drum is rotatably supported in a closed combustion chamber, sawdust is fed into one end of the drum while the drum is rotated to move the sawdust towards the other end and a hot gas at sufficient temperature to distill the sawdust is circulated through the drum to generate the smoke and carry the same out of the combustion chamber and into a smoke receiving compartment.

It is a further object of the invention to provide in a smoke generator a sawdust receiving open-ended tube which is mounted within a combustion chamber for rotation about a longitudinal axis which is at an inclination to the horizontal, a supply mechanism for feeding sawdust to the uppermost end of the tube so that the sawdust is moved by rotation of the tube towards the lowermost end, mechanism for circulating a hot gas within the combustion chamber which gas is at sufficient temperature to distill the sawdust as it circulates through the tube, and a smoke receiving chamber which is arranged in communication with the lowermost end of the tube to receive the smoke therefrom.

It is another object of the invention to provide a smoke generator in which an open-ended smoke tube is supported in rotatable relation in a closed combustion chamber, with the smoke tube rotatable about a longitudinal axis at an inclination to the horizontal, sawdust is fed to the upper end of the smoke tube and tumbles by gravity towards the lower end thereof as the smoke tube is rotated, a smoke receiving compartment is arranged in communication with the lower end of the smoke tube to receive the smoke, a hot gas is circulated within the combustion chamber and the smoke tube to distill the sawdust and a conveyor is arranged in communication with the lower end of the combustion chamber to receive therefrom the residue or ash which is discharged from the lowermost end of the smoke tube and automatically convey the same out of the combustion chamber.

These and other objects and advantages of the invention will be apparent from a consideration of the mechanism which is shown by way of illustration in the accompanying drawings wherein:

Fig. 1 is a side elevation of a smoke generator which incorporates therein the principal features of the invention;

Fig. 2 is a rear end elevation of the smoke generator;

Fig. 3 is a front end elevation of the smoke generator;

Fig. 4 is a longitudinal section through the machine, taken on the line 4—4 of Fig. 3;

Fig. 5 is a transverse section, taken on the line 5—5 of Fig. 4, to an enlarged scale;

Fig. 6 is a longitudinal section, to an enlarged scale, through the ash disposal conveyor mechanism;

Fig. 7 is a schematic layout showing the fluid burner and its associated control mechanism; and Fig. 8 is a wiring diagram showing the electrical mechanism for controlling the operation of the machine.

Referring to the drawings there is illustrated a smoke producing machine which embodies the principal features of the invention and which is designed to be used in supplying smoke to a smoke house for the processing of meats or similar substances.

In the illustrated device there is provided a supporting structure 10 which includes a front frame 11 and a rear frame 12 connected by longitudinally extending bottom side rails 13, top side rails 14 and intermediate side rails 15.

A hollow member 16 which is in the form of an elongate cylindrical section of substantial diameter is provided which forms a retort or combustion chamber. The combustion chamber forming cylinder 16 extends longitudinally of the supporting frame structure 10 and is supported at its front end on a cross bar 17 connecting two generally vertically extending laterally spaced frame members 18, the latter being inclined vertically, and rearwardly or inwardly of the frame 10 as shown. The cylinder member 16 is closed at its forward end by a closure plate 19 which is connected to the supporting frame member 17 and which is provided on its inner side with a heat insulating member 20. The body portion of the cylinder 16 is also provided with a heat insulating outer member or material 21. At its rear end the cylinder 16 is provided with a closure plate 22 having a central aperture 23 which communicates with the lower portion 24 of a vertically extending smoke receiving stack formation 25. The upper end of the smoke receiving structure 25 is supported on the rear frame 12 and is connected by suitable conduit (not shown) with the interior of a smoke house.

A smoke tube 26 which comprises an open-ended elongate tubular or cylindrical section is supported within the cylindrical member 16 on a rotatably mounted shaft 27. The smoke tube 26 is attached to the shaft 27 by a plurality of spider-like brace members 28, 29 and 30.

The shaft 27 is supported at the forward end of the cylinder 16 by an external bearing formation 31 which is secured on the end plate 19 and cross bar 17 and extends forwardly thereof. The bearing support 31 is inclined relative to the horizontal and carries the double bearing 32 which supports one end of the shaft 27. The other end of the shaft 27 extends in sealed relation through an aperture 33 in the rear wall 34 of the lower portion 24 of the smoke chamber 25.

The smoke tube 26 is provided on its internal surface with a plurality of circumferentially spaced longitudinally extending rib formations 36 which form in effect a corrugated-like surface and which are shaped to catch the sawdust as the tube 26 revolves and to agitate or tumble it in the form of a shower as it advances by gravity through the tube 26 in the direction of the axis thereof, from the higher to the lower end of the same. The tube 26 is somewhat shorter than the combustion cylinder 16 and the lower or discharge end thereof is arranged in slightly spaced relation to the rear end plate 22 with a sealing ring 37 of small rectangular cross section arranged between the end of the tube 26 and the plate 22 to close all but a small portion of the space between the same, the lower portion of the sealing ring 37 being cut out at 38 to permit the charred residue from the burned sawdust to be discharged from the tube 26.

Sawdust, indicated at 39 (Fig. 4) is supplied to the upper end of the tube 26 from a hopper 40 which is supported on the upper frame rails 14 and 15 and which has a feeding aperture 41 in the bottom in communication with a feeding device 42 which delivers measured quantities to a tubular conduit 43 extending through a suitable aperture 44 in the end supporting wall 19 and having its end 45 projecting into the upper inclined end of the smoke tube 26. The feeding device comprises a pocketed feeding wheel 46 which is supported on a shaft 47 mounted in suitable bearings in a housing 48 which is secured to the bottom of the hopper 40. The shaft 47 is provided on its outer end with a sprocket 49 which is connected by a drive chain 50 with a drive sprocket 51 on a ratiomotor 52 which is mounted beneath the hopper 40. The ratiomotor 52 is connected with the control devices for the machine and when operating rotates the feed wheel 46 to feed the sawdust out of the hopper 40 and through the conduit 43 to the smoke tube 26 in measured amounts.

At its inner end the shaft 47 carries a beveled pinion 53 which is in driving engagement with cooperating pinion 54 on a depending shaft 55 which is supported in the housing 41 and carries on its upper end agitator blade 56 for agitating the sawdust 39 in the bottom of the hopper 40 upon rotation of the shaft 47.

The combustion cylinder 16 is supplied with the necessary heated gas for distilling the sawdust by means of a gas burner which is indicated at 57 (Figs. 4 and 7) and which is supported in the rear end plate 22 of the cylinder 16, and extends into the latter. The burner 57 is provided with a burner tube 58 which is open at its opposite ends and provided with perforations or apertures 59 in its peripheral surface. The burner tube 58 is supported by brackets 60 (Fig. 5) extending from the inner wall of the cylinder 16 and is aligned with the burner 57 to extend the flame along the rotating smoke tube 26. The burner 57 is provided with a supply pipe connection at 61. A mixture of gas and air is supplied to the burner 57 so that the temperature in the combustion cylinder is maintained at approximately 700° F. with substantially all of the oxygen being consumed in the combustion of the gas so that there is no appreciable free oxygen within the closed cylinder. The products of combustion resulting from the burning of the mixture of gas and air circulate in the cylinder 16 and pass through the tube 26 into the smoke stack 25 carrying with the same the smoke and other products released by the distillation or burning of the sawdust in the tube 26. The end plate 22 and the lower portion 24 of the smoke stack 25 are preferably provided with a heat insulating cover indicated at 62.

The combustion cylinder 16 is provided with a residue discharge opening 65 at the bottom of the lower end. A passageway 66 connects the opening 65 with a residue or ash disposal tube 67 extending in the same general direction as the smoke tube 26 and mounted beneath the cylinder 16. A screw conveyor 68 is supported within the tube 67. At the rear end of the tube 67 a suitable bearing 69 in the end wall member 22, supports the conveyor shaft 70 while the front end of the shaft is connected to the output shaft 71 (Figs. 4 and 6) of a change speed device or transmission of a motor drive unit 72. A depending bracket 73 supports the front end of the tube 67 and a closure plate or sealing washer 74 is mounted in sliding relation on the end of the shaft 68 and urged into closing relation with the end of the tube 67 by a compression spring 75 which engages the outer face of the sealing washer 74 at one end and a cross pin 76 at the other end. The rotation of the screw conveyor 68 is controlled so that it feeds the residue or ash toward the upper end of the tube 67 and causes the same to be discharged therefrom by forcing the washer 74 away from the end of the tube 67 against the action of the spring 75. The ash drops into a collecting receptacle 77 which may be mounted on the lower frame rails 13 for ready removal from the machine to dispose of the ash.

While maintenance of effective controls in the combustion cylinder 16 eliminates condensation of creosote in the same, some condensation may occur in the smoke receiving compartment or stack 25 immediately adjacent the combustion cylinder 16. The lower portion or section 24 of the smoke stack 25 is somewhat smaller in cross section than the upper portion and extends within the latter at 78 to provide a relatively small channel-shaped collecting sump 79 in the lower end of the upper section of the stack 25. The sump 79 is provided with a drain conduit 80 which extends through the lower portion 24 of the smoke stack and empties at its lower end 81 into a receptacle 82 which is removably positioned on the cross frame members 13 exteriorly of the smoke stack. The lower end 81 of the drain conduit 80 extends through a suitable aperture in the back wall of the lower end of the stack section 24. The stack section 24 is also apertured at 83 to provide a connection between the interior of the same and the passageway 66 into the ash removal tube 67 to allow any ash or other solids carried into the smoke stack to be removed with the ash.

A motor 84 is connected with and supplies driving power to the reduction gear 72. The reduction gear 72 carries on its power output shaft 71 a sprocket 85 which is connected by a drive chain 86 with the sprocket 87 on the shaft 27. An idler tension sprocket 88 is mounted on a support arm 89 and controls the tension in the chain 86. The arm 89 is adjustably mounted on the fixed bracket member 90.

The burner 57 is provided with a suitable pilot 91 (Fig. 7) and a mixture of air and gas is supplied to the same through suitable valves, certain of which are electrically controlled. A thermostat 92 is mounted in a housing 93 provided in the lower or rear end of the combustion cylinder 16 and the lower section 24 of the smoke stack 25, which is connected into the electrical control system as illustrated schematically in Fig. 8.

Gas is supplied through the line 94 to a relay controlled valve 95, thence through the zero governor 96 to the inspirator 97 where it is mixed with air and delivered to the burner 57. The gas supply for the pilot burner 91 is, of course, supplied directly from the line 94 and controlled by the pilotstat 98. Air is supplied through the line 99 to a relay controlled valve 100 and through a system of control and adjustment valves to the inspirator 97. A manually adjustable valve 101 is provided in one connecting line to control the low temperature gas flow to the inspirator 97. Additional air may be supplied through two other lines having solenoid controlled valves 102 and 103, the former being under the control of the thermostat or temperature control device 92 in the combustion cylinder 16, and the latter being under the control of the sawdust feeder switch 104, 105. Manual adjusting or regulating valves 106 and 107 are provided in these lines in addition to the electrically operated valves 102 and 103. Under normal operating conditions the gas/air ratio is approximately 1 to 10 using natural gas of 970 B.t.u./cu. ft.

The electrical controls for the motors 84 and 52 and other equipment, as illustrated diagramatically in Fig. 8, also comprise smoker start and stop switches 106 and 107 and timing relay 108 which is adjustable up to a predetermined maximum of three (3) minutes for delayed closing of its contacts when the smoker stop switch is operated to shut down the machine. The equipment also includes the pilotstat 98 for controlling the flow of gas to the pilot burner 91 which is connected to the timing relay 108, and a temperature control device 92. The latter controls the relays for operating the gas and air valves 95, 102 and 103. A green signal light is provided at 109 which is controlled by the thermostat or temperature control device 92.

In operation, the hopper 40 is provided with a supply of sawdust, and the gas, air and electricity are turned on. The pilotstat 98 is operated and the pilot burner 91 is lighted. The switch 106 is operated to start the smoker which starts the motor 84, provided the pilotstat contacts are closed, and also starts the flow of gas and air to the burner 57. When the temperature in the combustion cylinder 16 has reached a predetermined value, approximately 700° F., the signal light 109 comes on through operation of the temperature control 92. The sawdust feed starter switch 104 may then be turned on to actuate motor 52 and feed sawdust through the conduit 43 into the upper end of the rotating smoke tube 26. The sawdust tumbles toward the bottom of the smoke tube 26 and is burned by the hot mixture of combustion gases which circulate through the tube 26, the residue or ash being discharged through the passageway 66 to the screw feed 68 and through the ash tube 67 for discharge at the other end thereof. The smoke generated is carried by the combustion gases through the aperture 23 and into the smoke stack 25.

The sawdust feed may be discontinued and restarted at will by the operator by pressing feed stop or feed start buttons, 105 and 104. To stop the smoker the switch 107 is pressed which stops the feed and starts the time delay switch 108 which allows sawdust in process to be passed through and leave the retort 16 free of sawdust. The motor 84 then stops and the main gas and air valves 95 and 100 are closed.

While specific materials and details of construction are referred to in describing the illustrated mechanism, it will be understood that other materials and other details of construction may be resorted to within the spirit of the invention.

I claim:

1. In a device for distilling sawdust, a cylindrical housing having end closure members providing a substantially closed combustion chamber, means for supporting said housing with its longitudinal axis inclined relative to the horizontal, an elongate open ended tubular section of a diameter somewhat smaller than the diameter of the housing mounted within said housing, said tubular section being mounted for rotation about a longitudinal axis which is coincident with the longitudinal axis of the housing, said tubular section having on its internal wall a plurality of circumferentially spaced longitudinal rib forming members of angular cross section, a sawdust supply bin adjacent said housing, means including a conduit extending through the upper end closure member of said housing for delivering measured quantities of sawdust from said bin into the upper end of said tubular section at regular intervals, means for rotating said tubular section about its axis to cause the sawdust to tumble in a free falling shower toward the other end thereof, a smoke stack connected with the lower end of said housing, the lower end closure member having an opening providing a passageway from the lower end of said tubular section to said smoke stack, means for delivering a hot gas within said housing and for causing the same to pass through said tubular section, and means for maintaining said gas at a temperature sufficient to cause distillation of the sawdust as it moves toward the lower end of said tubular section while said combustion chamber is maintained substantially free of oxygen.

2. In a device for distilling sawdust, an insulated housing providing a hollow cylindrical combustion chamber, said housing having end closure members, an elongate hollow drum mounted within said housing for rotation about an axis which is arranged at an angle to the horizontal, a sawdust supply hopper above said housing, a conduit extending from the hopper through the upper end closure member of said housing and into the upper end of said drum for delivering sawdust into the upper end of said drum, means for rotating said drum about its axis at a speed sufficient to cause the sawdust to be carried upwardly on the walls of the drum and to tumble freely toward the lower end thereof, the sawdust being advanced solely by gravity, a smoke receiving member connected to the closure member at the lower end of said housing, said closure member having an aperture permitting communication between the smoke chamber and the lower end of said drum, means for delivering a hot gas within said housing and for causing the hot gas to circulate through said drum, said gas being at a temperature sufficient to cause distillation of the sawdust as it moves in a free falling shower toward the lower end of said drum, an aperture at the lower end of said drum for discharging the ash resulting from the distillation of said sawdust, the lower end of said drum terminating adjacent the wall of the housing a sufficient distance to permit discharge of the ash, a closed ash delivery tube connected to the lower end of said drum and covering said aperture, said ash delivery tube having a rotatable screw conveyor therein, and means to rotate said screw conveyor for conveying said ash away from said drum, whereby the distillation is carried out in a closed chamber and the latter is maintained substantially free of oxygen.

References Cited in the file of this patent

UNITED STATES PATENTS

| Number | Name | Date |
|---|---|---|
| 255,925 | Breer | Apr. 4, 1882 |
| 545,121 | Cummer | Aug. 27, 1895 |
| 562,158 | Sears | June 16, 1896 |
| 1,179,192 | Kleinschmidt | Apr. 11, 1916 |
| 1,453,057 | Williams | Apr. 24, 1923 |
| 1,835,147 | Drew | Dec. 8, 1931 |
| 2,072,364 | Gray | Mar. 2, 1937 |
| 2,094,152 | Granger | Sept. 28, 1937 |
| 2,127,328 | Egan | Aug. 16, 1938 |
| 2,265,857 | Reynoldson | Dec. 9, 1941 |
| 2,488,653 | Andree et al. | Nov. 22, 1949 |
| 2,515,455 | Lipton | July 18, 1950 |
| 2,735,807 | Banker | Feb. 21, 1956 |